United States Patent [19]

Musacchia

[11] Patent Number: 5,607,091
[45] Date of Patent: Mar. 4, 1997

[54] UNIVERSAL GAME CALL ADAPTER AND HOLDER

[76] Inventor: John Musacchia, 110 Beasley Rd., Cartersville, Ga. 30120

[21] Appl. No.: 498,434

[22] Filed: Jul. 5, 1995

[51] Int. Cl.⁶ .................................. A45C 13/30; A45F 3/14
[52] U.S. Cl. ..................... 224/222; 224/250; 224/251; 224/267; 108/43; 446/26; 446/404
[58] Field of Search ......................... 224/101, 191, 224/218, 219, 222, 224, 225, 250, 251, 267, 277; 108/43; 446/26, 28, 397, 404

[56] References Cited

U.S. PATENT DOCUMENTS

| 1,786,254 | 12/1930 | Meehan | 224/222 |
|---|---|---|---|
| 2,338,816 | 1/1944 | Lockhart | 108/43 |
| 2,420,673 | 5/1947 | Monrad | 108/43 |
| 2,701,173 | 2/1955 | Senior et al. | 108/43 |
| 3,407,757 | 10/1968 | Warner | 108/43 |
| 4,243,249 | 1/1981 | Goss | 108/43 |
| 4,422,640 | 12/1983 | Tamarkin | 108/43 |
| 4,494,754 | 1/1985 | Wagner, Jr. | 108/43 |
| 4,494,755 | 1/1985 | Caillouet, Jr. | 108/43 |
| 4,606,733 | 8/1986 | Willis . | |
| 4,648,603 | 3/1987 | Hayford, Jr. | 224/222 |
| 4,955,845 | 9/1990 | Piper . | |
| 5,035,390 | 7/1991 | Sanders . | |
| 5,069,375 | 12/1991 | Flick | 108/43 |
| 5,111,981 | 5/1992 | Allen . | |
| 5,178,575 | 1/1993 | Koch . | |
| 5,244,430 | 9/1993 | Legursky . | |
| 5,263,423 | 11/1993 | Anderson | 108/43 |
| 5,450,993 | 9/1995 | Guerrero et al. | 224/250 |

FOREIGN PATENT DOCUMENTS

103154  1/1917  United Kingdom ................. 108/43

*Primary Examiner*—Henry J. Recla
*Assistant Examiner*—Gregory M. Vidovich
*Attorney, Agent, or Firm*—Richard C. Litman

[57] ABSTRACT

A universal holder for retaining various configurations of game calls affixed to a limb of a hunter includes a platform provided with a circular aperture within which similarly configured game calls may be nested. The game call is retained in this manner by an elastic member having no less than one stretch bridging the aperture and when thus retained, its bottom sound emanating surface is maintained in a position elevated from a user's limb by legs depending from the platform. An adjustable, flexible body attaching member serves to secure the retained game call relative the user's limb. Non-circular or elongated box-type game calls are retained atop the platform by the same elastic member but wherein the stretch is passed beneath the platform with a portion thereof displaced upwardly through the aperture to releasably engage a catch element on the game call.

11 Claims, 6 Drawing Sheets

UNIVERSAL GAME CALL ADAPTER AND HOLDER

BACKGROUND OF THE INVENTION

1. Field of the Invention

This invention relates generally to hunting apparatus and more particularly, to an improved game call holder adapted to securely retain various types of game calls relative a hunter's body and in a manner that permits instant ready access without impeding the performance of percussive or friction generated types of game calls.

2. Description of the Prior Art

Game call devices have been employed by hunters for ages and are intended to attract particular species by producing sounds selected to imitate mating or other sounds made by the animal or fowl of interest to the hunter. Although game calls designed to attract numerous types of animals may benefit from the present apparatus, it finds an especial advantage when used to support game calls as used when hunting for turkeys. This type of game is particularly elusive, as any experienced turkey hunter will readily attest to. The eyesight of turkeys is so acute and their reaction time so quick that, upon detecting the slightest motion, the birds scamper away instantly.

Slate and box calls, either pin or rocker, are perhaps the most common types of hand actuated turkey calls being used. Although quite effective when in the hands of an experienced hunter, use of these devices, by their very nature, frequently result in lost opportunities for the hunter. This is because of the requirement that the hunter devote the use of both hands to operate the calls and then, when a gobbler has been called to a point within range, the hunter must drop or put down the call apparatus and then bring their shotgun up for the shot. All of these body motions are more than enough to frighten away any turkey within range.

Ideally, a turkey hunter will be able to select an appropriate location to establish a stand, such as seated, while resting against a tree. Presently, a hunter props or cradles their weapon while using both hands to hold and manipulate percussive or scratch type turkey calls and the subsequent body movement and noise when the call is discarded and the gun readied for firing, frequently sends the prey on its way. Even mouth call devices can result in enough body motion or noise to scare away many sighted turkeys since the user must either spit the call out or use their hand to remove it before bringing up their shotgun for any firing opportunity. In view of the required turkey shot load and the relative dense cover wherein this game is found, it will be appreciated that a rather limited range of fire is available and accordingly, a practically instantaneous response time is required with the absolute minimum of noise or motion. Thus, it is highly desirable that an apparatus be available that permits the secure attachment of various configurations of game calls to a user's body to allow a one handed operation thereof while the hunter maintains their weapon at the ready and wherein there is no requirement that the call be placed aside or discarded when the quarry is within range and before getting off a timely shot.

A prior example of a turkey call comprising the slate box type will be found in U.S. Pat. No. 4,606,733 issued to Alvin D. Willis on Aug. 19, 1986, and wherein a sound box includes a reciprocating striker rod that frictionally engages a planar striker plate juxtaposed a sound chamber. Such interaction between a striker member and a slate type element is representative of many slate box forms of turkey calls relying upon a frictional or percussive effect to replicate a game call. The instant invention is not concerned with the specific construction of any one form of game call but rather, is directed to a unique adapter or holder for any of several types of game calls.

U.S. Pat. No. 4,955,845 issued Sep. 11, 1990, to Frank R. Piper depicts another form of slate box game caller and although mentioning a one handed operation, this representation appears to allude to the interconnection of the multitude of sound producing components since the specification refers to holding the support structure in a user's hand. Such manipulation of a box call device is common since maximum success is achieved in reproducing a game call when there is minimum impedance to propagation of the sound vibrations emanating from the sound box or chamber. This patent also illustrates a holder for the device, in the form of a belt carried pouch, which holder is for transport purposes only and can not be considered the equivalent of the present holder apparatus that securely engages and retains various types of calls in an elevated manner spaced from the user's body so that the sound reverberations are allowed to issue from beneath the associated call device.

It is known to provide an adapter for attaching a call device to a firearm as shown in U.S. Pat. No. 5,035,390 issued to Joseph Sanders on Jul. 30, 1991, and which suggests an apparatus for facilitating the use of an animal call while keeping one's firearm at the ready. Unlike the instant arrangement which is secured to a hunter's thigh, Sanders' device is affixed to the firearm and would apparently offer an unbalanced mass on the weapon while limiting the sizes and types of call apparatus that could be attached thereto.

A further example of a hands free type of game call holder will be found in U.S. Pat. No. 5,111,981 issued May 12, 1992 to Melvin L. Allen and wherein a mouth game call apparatus is supported on a user's chest by a strap arrangement. This is a departure from the present apparatus involving a holder for a percussive type game call and which securely supports the call in a manner elevated from the adjacent body limb to which it is attached so that an unimpeded dissipation of the sound waves may occur from beneath a sound producing component affixed thereto.

A further example of a typical frictional or percussive type of game call which may be used with the holder of the present invention will be found in U.S. Pat. No. 5,178,575 issued Jan. 12, 1993, to Clarence E. Koch and which shows a sound box fitted with a striker plate that cooperates with a striker element to produce the desired sound. Again, no holder pursuant to the present apparatus is seen in this patent.

Another holder for a game call will be found in U.S. Pat. No. 5,244,430 issued Sep. 14, 1993, to Roy A. Legursky and which illustrates a carrier device for the transport of a caller. A specifically configured support is constructed to cooperate with a mating configuration on the bottom of a turkey caller to receive same. Although adjustable straps are shown for attaching the carrier to a user's limb, it is apparent that the carrier support flushly engages the caller box bottom which is contrary to the present construction wherein any of several off-the-shelf game calls are readily secured to a single holder member that supports the call bottom surface in spaced apart relationship to the limb of the user.

None of the above inventions and patents, taken either singly or in any combination, is seen to even remotely suggest or describe the instant invention as claimed herein.

SUMMARY OF THE INVENTION

The game call holder of this invention provides a unique apertured platform or base upon which various types of game calls may be disposed such that maximum resonance emanating from the bottom of the sound box or chamber will be allowed to migrate into the surrounding ambient air. The circular configuration of the platform aperture accommodates any of several existing round slate box types of game calls while elongated box types of call devices are accepted upon the peripheral planar areas of the platform with the majority of the bottom surfaces thereof spanning the opening in the platform. All such types of game calls are thence secured atop the holder platform by an elastic element which is alternately manipulated to accommodate the various types of calls. When using a circular slate type game call, the associated striker may be tethered to the holder so that when attracted game is within range, the striker can be merely dropped to the side and will not strike the ground, as the user takes aim with his weapon.

Accordingly, one of the objects of the present invention is to provide an improved game call adapter and holder including a platform supportable upon the limb of a user and retained thereupon by an adjustable attachment assembly securing the platform and an attached game call well spaced from the user's limb.

Another object of the present invention is to provide an improved game call adapter and holder including an apertured platform having legs supporting the platform spaced from a user's limb and including an elastic element stretchable either over a game call nested within the aperture or under the platform and displaced up through the aperture to secure various configurations of calls to the platform with their bottom communicating with the aperture in the platform.

A further object of the present invention is to provide an improved game call adapter and holder including opposed depending legs on an apertured platform with one end of an elastic retainer element attached to one leg and the other end thereof releasably attachable to the other leg after engagement of a game call, to secure the game call atop the platform.

Still another object of the present invention is to provide an improved game call adapter and holder including an apertured platform having an inclined or stepped peripheral wall adapted to accommodate the peripheral wall of variously dimensioned game calls.

These and other objects of the present invention will become readily apparent upon further review of the following specification and appended claims.

BRIEF DESCRIPTION OF THE DRAWINGS

Similar reference characters designate corresponding parts throughout the several figures of the drawings.

DETAILED DESCRIPTION OF THE PREFERRED EMBODIMENTS

Referring now to the drawings, particularly FIGS. 1–4, the present invention will be seen to comprise a holder or adapter, generally designed 10 and which is constructed to provide an elevated, planar platform 12 having opposite front and rear legs 14,16 respectively, depending therefrom. As will be seen most clearly from FIGS. 2–4, the planar platform, which is generally square or rectangular, includes a pair of oppositely disposed side wings 18, 20 defining a lateral extent to the platform which is greater than that of the two legs 14, 16, while the center of the platform is provided with a circular cut-out or aperture 22. The peripheral wall 24 of this aperture 22 is preferably tapered inwardly but alternately may be stepped from the platform top surface 26 to its bottom surface 28 for reasons which will become obvious hereinafter.

Figure 1:
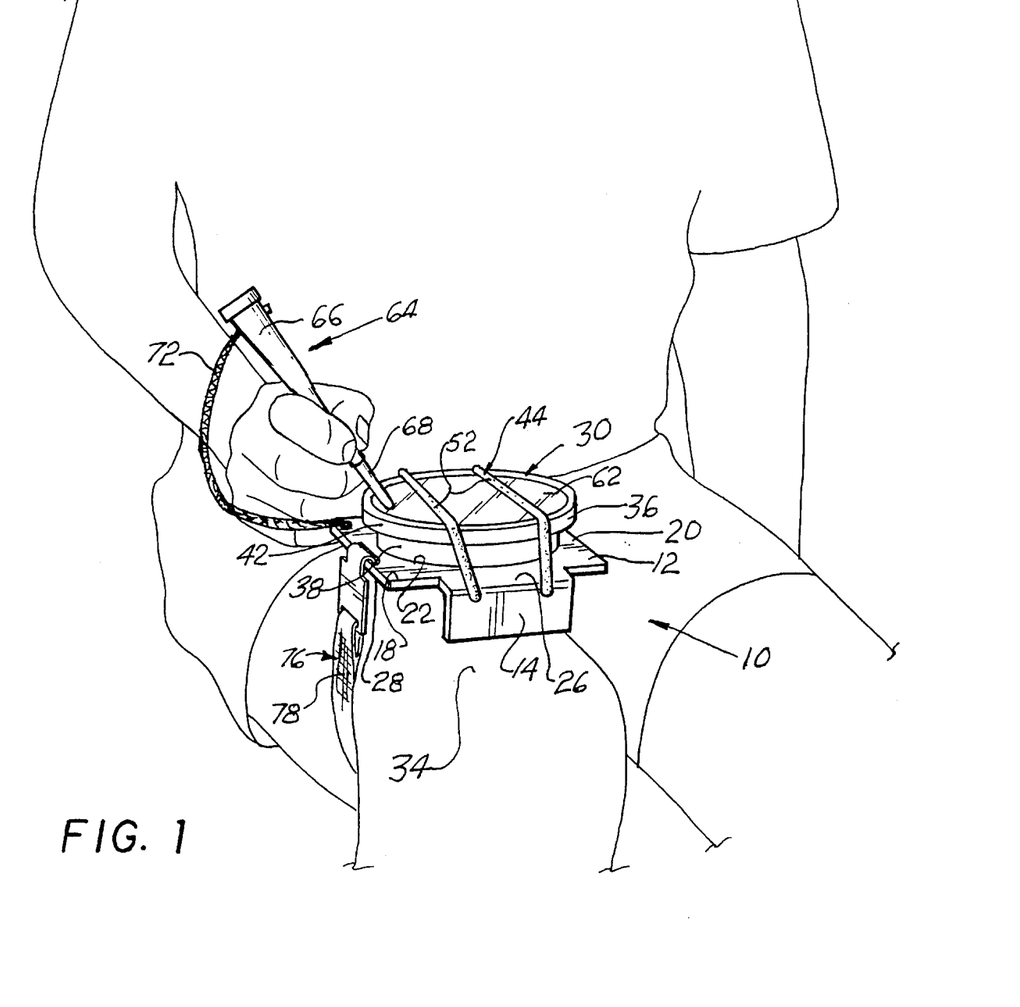
FIG. 1 is a perspective view of the game call adapter and holder as it appears in use.

The intent of the raised planar platform 12 is to provide a support surface that is disposed in a plane well spaced from the limb of a user when the holder 10 is attached to one's body as depicted in FIG. 1, so that any game call such as the slate call 30, when affixed thereto will have its lower, sound emanating surface 32 positioned away from the user's body. As previously mentioned, an ideal and most comfortable stand when turkey hunting is to assume a seated position with one's back resting against a tree. Accordingly, with one leg drawn up, the hunter's thigh 34 will then offer an ideal location for attaching the holder 10 of the invention as it will position a game call affixed thereto immediately adjacent the chest and very close to the trigger of a gun (not shown) poised at the ready. In the case of a right handed shooter, the holder 10 would be attached to one's right thigh 34, for manipulation by the right hand while the left leg and arm serve to support the firearm.

The platform aperture 22 mentioned above is provided to accommodate game calls having a circular configuration such as several slate type calls. A typical example of such devices will be found in the Ultimate model game call as manufactured by Knight & Hale Game Calls, Inc., and which is generally representative of the illustrated game call 30. Such calls include a housing or sound case 36 having a circular periphery 38 which frequently is tapered or stepped inwardly towards the call bottom face 40. This construction is adapted to be received within the holder platform aperture 22 which presents a seat for snugly receiving call housings having varying diameters. The top of some circular calls are provided with an enlarged diameter rim presenting a shoulder 42 that may serve to keep a call from passing through the aperture.

Figure 2:
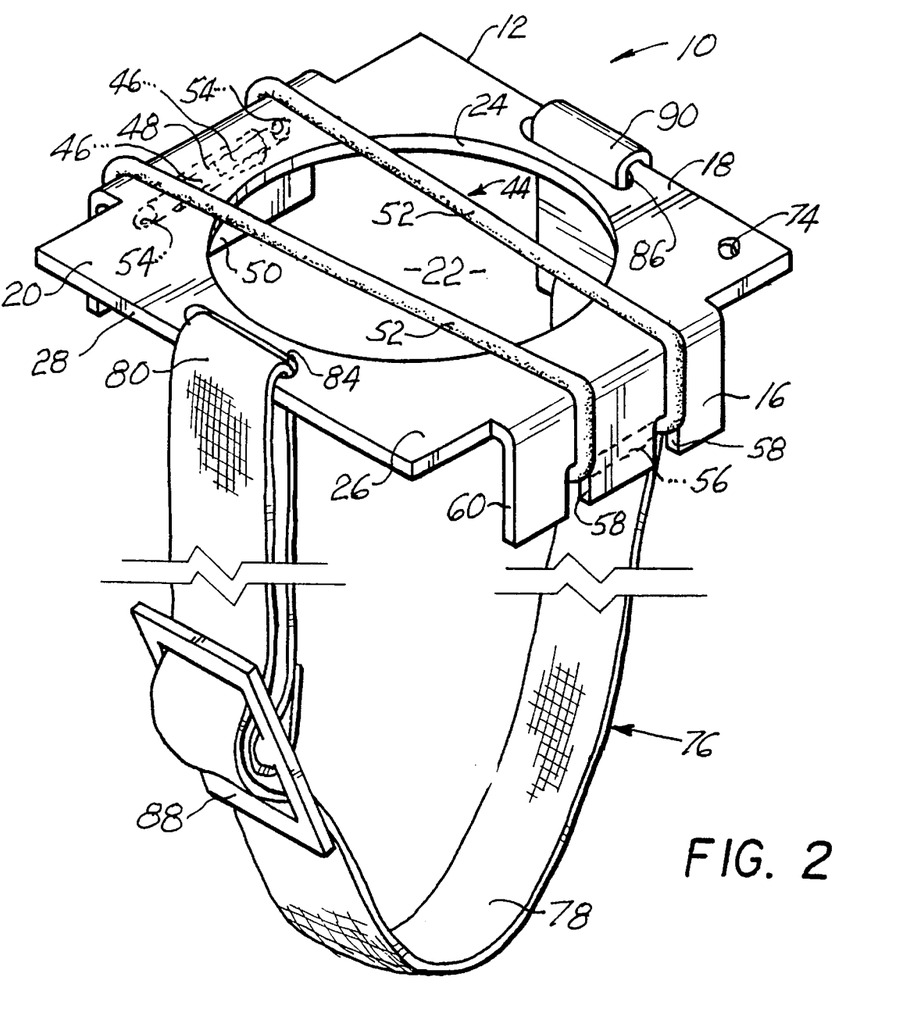
FIG. 2 is an enlarged perspective view of the subject holder ready to receive a game call device.
Figure 3:
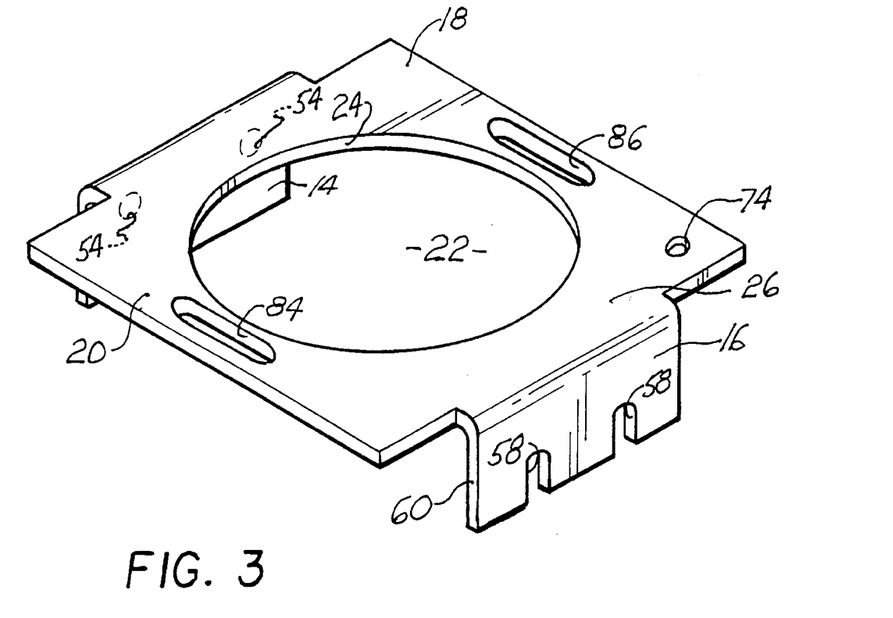
FIG. 3 is a perspective view of the holder base.
Figure 4:
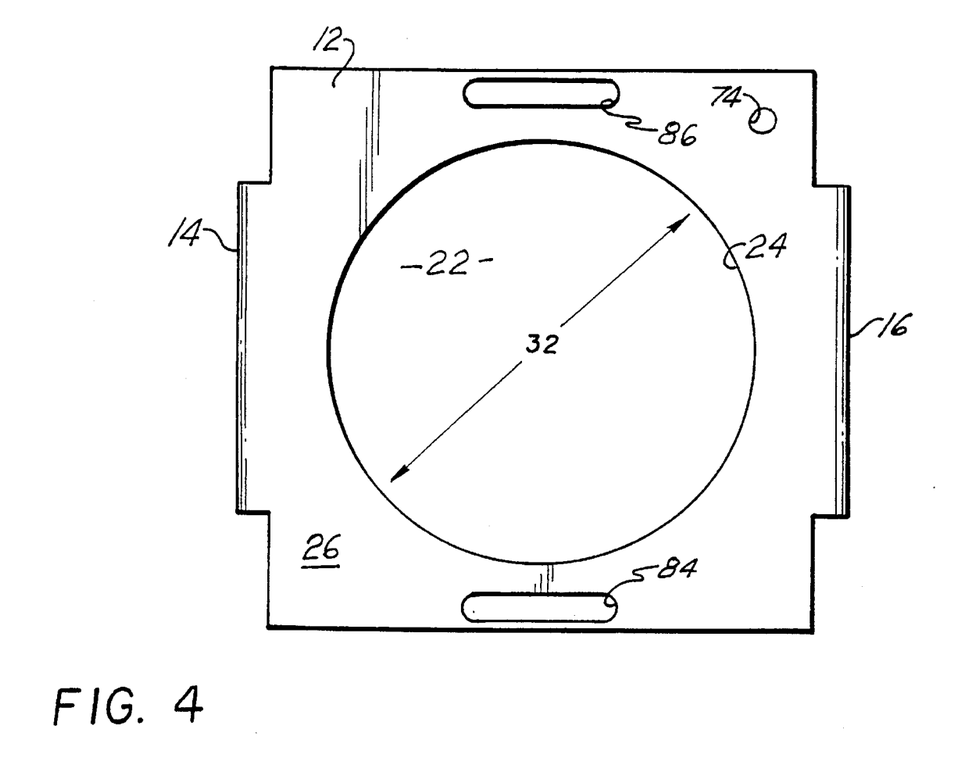
FIG. 4 is a top plan view of the holder base of FIG. 3.
Figure 5:
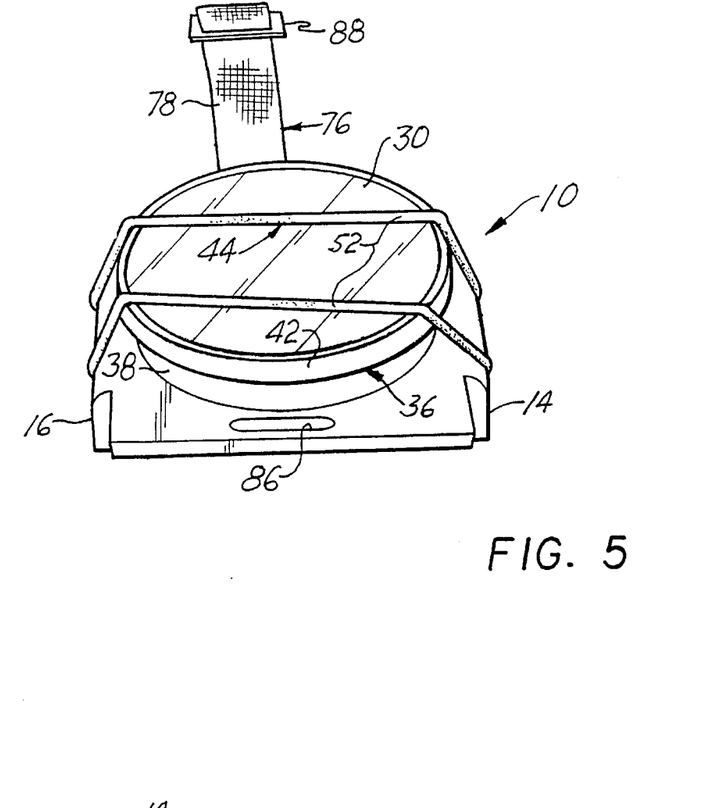
FIG. 5 is a side perspective view of the holder with a slate box type of game call secured thereto.
Figure 6:
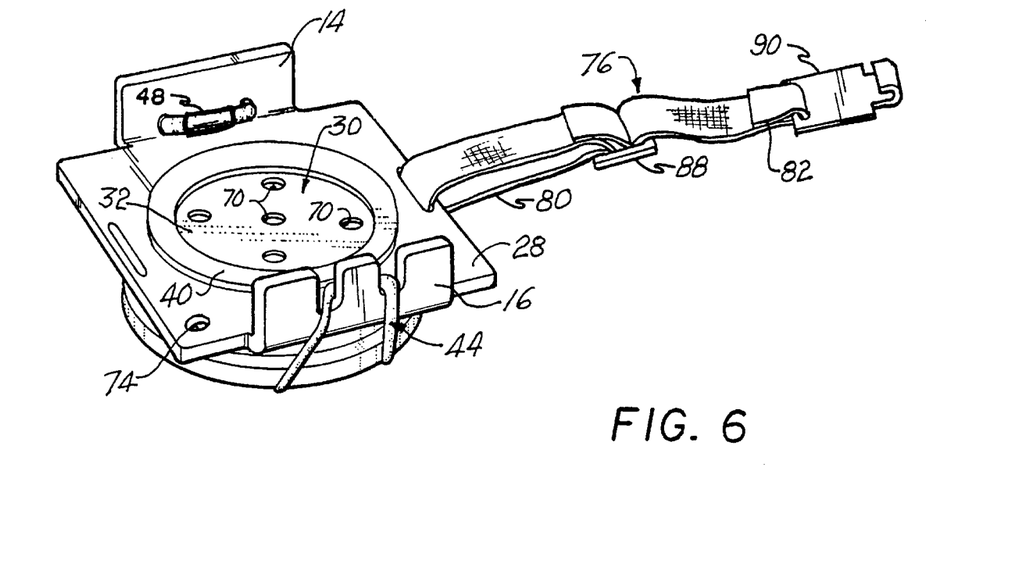
FIG. 6 is a bottom perspective view of the holder assembly shown in FIG. 5.

With a circular call 30 disposed within the holder aperture 22, the call is effectively secured there within by the application of a retainer element 44 in an overlying manner atop the game call 30. Although any of several types of elongated members may be used to span and retain the call in place, an endless or continuous elastic member as shown in the drawings has been found to be extremely reliable, offering both adjustability in that it accommodates various sizes and types of calls and also provides a quick and simple manner for securing and releasing game calls from the holder 10. FIG. 2 most clearly illustrates the construction of the retainer element 44 which comprises a single length of elastic cord or the like, having its two otherwise free ends 46—46 suitably joined, as by a connector 48, under the platform 12 and adjacent the inside face 50 of the front leg 14. The two stretches 52—52 of the retainer element thence pass through respective holes 54—54 in the front leg 14 and are adapted to be positioned, while tensioned, in a spaced-apart and bridging manner, across the platform aperture 22. In a stored, non-use condition, the retainer element 44 is positioned as in FIG. 2 with its intermediate portion 56 passed over the rear leg 16, through a pair of slots 58—58 and disposed against the inside face 60 of the rear leg 16.

When it is desired to secure a game call 30 to the holder 10, the retainer element 44 is released from the slightly tensioned condition as in FIG. 2, by removing the intermediate portion 56 from behind the rear leg 16. Then, the call 30 is seated into the aperture 22. The stretches 52—52 of the retainer element 44 are then passed over the top slate 62 of the call and anchored to the rear leg 16 as described above. It will be understood that in this secured position, as in FIG. 1, the retainer element stretches 52—52 are placed under a greater tension than when not engaging a game call and this increased tension further insures a most positive fixing of the game call relative the holder 10.

As will be known to those skilled in the art, the game call 30 as in FIG. 1 includes an uppermost slate 62 that presents a highly frictional surface when rubbed by a hard, disparate member such as the illustrated striker 64. A typical striker 64 includes a handle 66 provided with a forward scratch element 68 and a user obtains various sounds upon scratching or rubbing the scratch element 68 back and forth across the surface of the slate 62. The resultant sounds are amplified or concentrated within the confines of the call housing 36 and emanate from a plurality of holes 70 formed in the housing bottom face 40. Since this bottom face 40 is disposed in a position well elevated above the user's thigh 34, the produced sounds are not muffled and pass into the ambient air practically unaltered.

From the view of FIG. 1 it will be seen that a flexible lanyard or tether 72 may be provided to keep the striker 64 from becoming separated from the holder 10 and additionally precluding it from hitting the ground when suddenly released, as when the hunter spies a ready target and reaches for the gun trigger. One end of the lanyard 72 may be secured through a hole 74 formed in a rear corner of the platform 12 while the opposite end is secured to the handle 66 of the striker 64.

With a game call 30 secured to the holder/adapter 10 as above described, the assembly is firmly attached to the hunter's limb 34 by manipulating a body attachment assembly 76, shown most clearly in FIGS. 1–2 and 5–6. This assembly, like the retainer element 44, comprises an elongated flexible element or strap 78 having one closed end 80 affixed to the holder 10 with it's opposite free end 82 adapted to be releasably connected to another portion of the holder after passing the elongated element about the user's limb 34. Each of the platform side wings 18,20 is provided with a receiving formation comprising an elongated closed slot 84 or 86 with the closed loop end 80 of the flexible strap 78 passing through one slot 84. A slidable buckle 88 or the like, intermediate the ends of the strap, allows initial adjustment of the overall length of the body attaching assembly 76 pursuant to an individual's limb size, clothing bulk and comfort level, when the assembly 76 is secured. This securing is obtained through a catch or hook 90 on the free end 82 and which is adapted to engage the other platform slot 86, following which the buckle 88 may be finally manipulated to snug the flexible element 78 to suit the user.

The apparatus will now appear as in FIG. 1, ready for use and when the hunter has attracted a target to his liking, the striker 64 is released and retained by its tether 72 while the hunter moves his hand to engage the gun trigger, the latter motion being only a few inches in most cases.

The universal nature of the present invention is evident upon realizing that various types, sizes and shapes of game calls may be readily mounted upon the holder 10 without any modification thereof. In the case of circular slate calls, the tapered or inclined nature of the aperture wall 24 naturally accommodates calls having various diameters. On the other hand, there are numerous types of rectangular box calls on the market and these obviously can not be fitted within the platform aperture 22.

Figure 7:
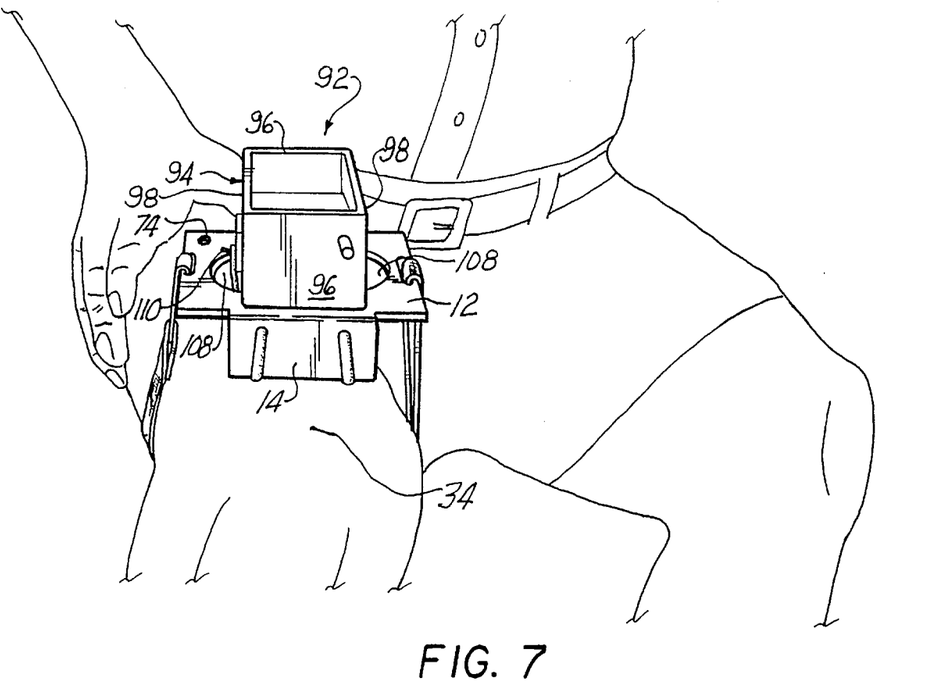
FIG. 7 is a front perspective view of a pin type turkey call as mounted on the holder of the invention.
Figure 8:
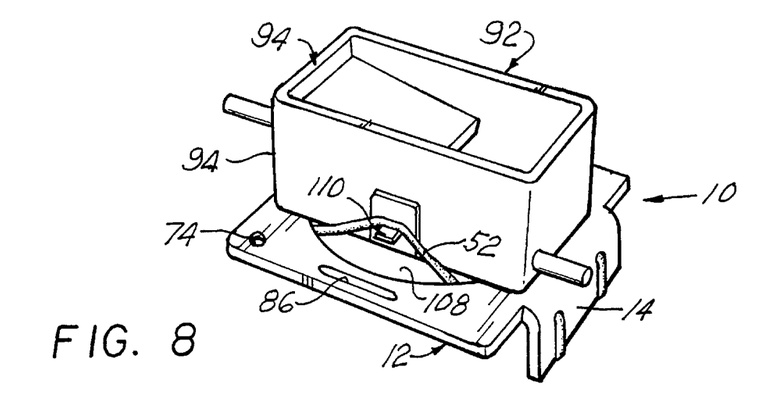
FIG. 8 is a side perspective view of the holder and box call shown in FIG. 7.
Figure 9:
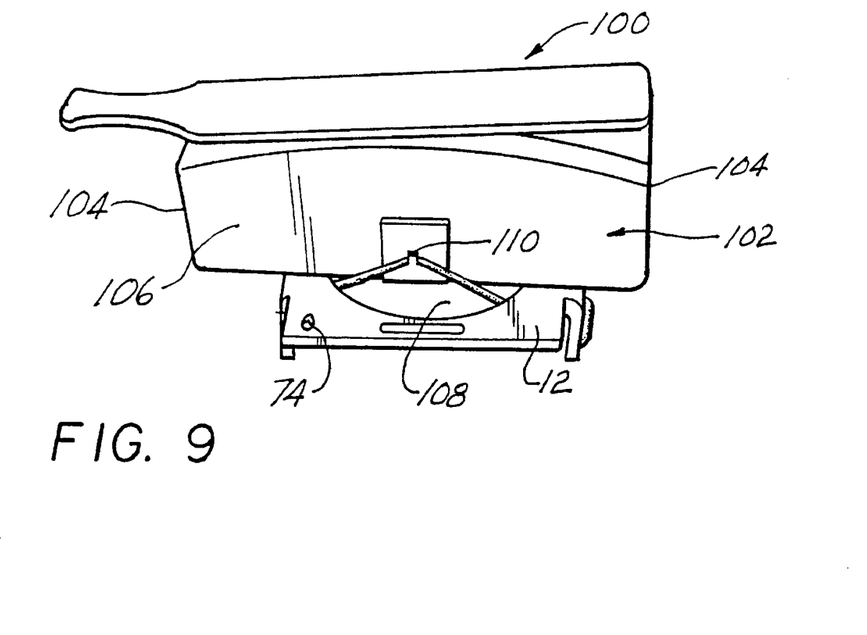
FIG. 9 is a side perspective view of a rocker box type of turkey call mounted on the holder.
Figure 10:
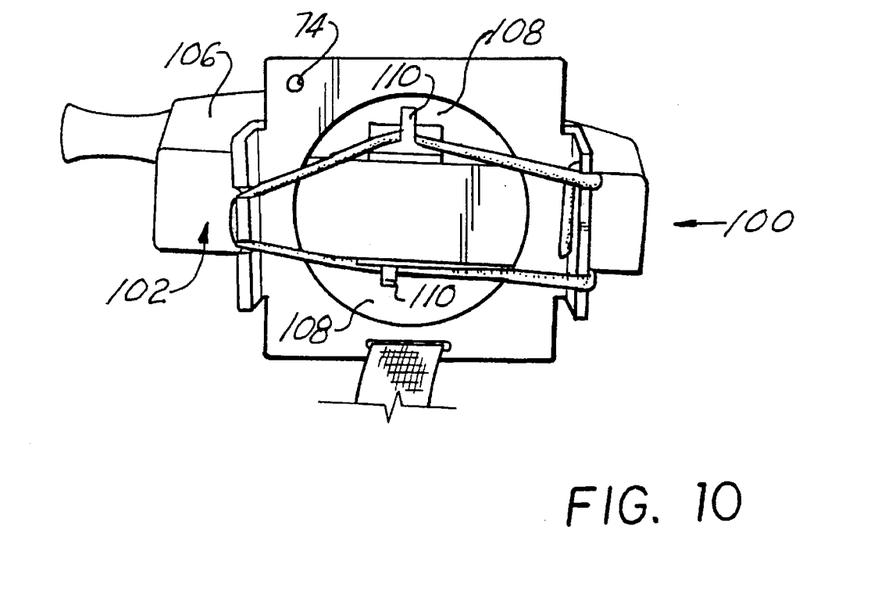
FIG. 10 is a bottom perspective view of the structure of FIG. 9.

FIGS. 7–10 illustrate the attachment of two typical types of rectangular box calls to the holder 10, using the same, unaltered retainer element 44. FIGS. 7–8 depict a pin type box call 92 having a rectangular sound box 94 including opposite end walls 96—96 and intermediate side walls 98—98. Although FIGS. 9–10 illustrate a rocker type call 100 its manner of attachment to the holder 10 is similar to that of the embodiment of FIGS. 7–8. In the case of the call 100, its rectangular sound box 102 also includes opposite end walls 104—104 and intermediate side walls 106—106. The diameter of the platform aperture 22 is significantly less than the length of both of these sound boxes 94,102, although the box width is less than the aperture diameter and the boxes 94,102 readily straddle the aperture with their end walls 96—96 and 104—104 juxtaposed the holder legs 14, 16 respectively.

Either box call 92, 100 is securely affixed to the holder 10 through use of the same retainer element 44 as used in connection with the first described embodiment. However, in the latter instances, the elastic stretches 52—52 of the retainer element are passed under, rather than over, the platform 12 and then each stretch 52 is pulled up through a respective clearance 108 as exists adjacent each box side wall 98 or 106. The medial area of each stretch 52 is then hooked over a catch 110 previously affixed to each box side wall 98 or 106. As will be clearly seen, such as from FIGS. 8 and 9, the retainer element stretches 52 will be further tensioned as they are displaced well above the plane previously occupied when extending in a straight disposition between the two legs 14, 16 of the holder 10 and this added tension firmly secures the calls relative the holder 10 so they may be manipulated with one hand while a hunter maintains his gun at the ready with the other hand.

From the foregoing it will be appreciated that an improved game call holder assembly is provided that permits the rapid attachment of various types and sizes of game calls to a single holder through the manipulation of an attached retainer element and whereby the attached game call is positively affixed relative a hunter's limb through the use of an adjustable body attaching assembly. The resultant attachment allows for the one-handed operation of the associated game call while allowing sound emanating from its sound box to issue unimpeded from its bottom face in view of the elevated disposition of the game call with respect to the user's body limb to which it is secured.

It will be understood that the present invention is not limited to the embodiments described hereinabove, but encompasses any and all embodiments within the scope of the appended claims.

I claim:

1. A game call holder comprising:

a platform having top and bottom surfaces and provided with an aperture therethrough;

legs depending from said platform;

a striker and a flexible tether, said tether having opposing portions respectively attached to said striker and said platform;

a retainer element including a resilient member having a stretch bridging said platform aperture; whereby said retainer element stretch may be deflected under tension to captively retain a game call having a lower sound emanating surface disposed over said platform aperture; and a body attachment assembly carried by said platform and encirclable about a limb of a user's body to secure said platform legs against the body limb; whereby the game call lower sound emanating surface is retained substantially spaced from the body limb.

2. A game call holder according to claim 1, wherein said platform is substantially rectangular and includes front and rear ones of said legs extending downwardly from said platform bottom surface.

3. A game call holder according to claim 1, wherein said retainer element includes two spaced apart stretches bridging said platform aperture.

4. A game call holder according to claim 1, wherein said body attachment assembly includes an elongated flexible element having one end connected to said platform, an opposite free end on said flexible element provided with a hook, and a receiving formation on said platform, whereby said hook is selectively engagable and disengagable relative said receiving formation.

5. A game call holder according to claim 4, wherein said receiving formation includes a slot in said platform.

6. A game call holder according to claim 4, wherein said flexible element includes a strap, and a buckle on said strap allowing of adjustment of the length of said strap.

7. A game call holder according to claim 1, wherein said platform aperture includes a peripheral wall tapering inwardly from said top to said bottom surfaces of said platform.

8. A game call holder according to claim 1, wherein said platform aperture is circular, whereby a game call having a circular body may be nested within said circular aperture.

9. A game call holder according to claim 1, wherein said retainer element stretch is juxtaposed said platform top surface, whereby said retainer element stretch may be disposed atop a game call nested within said aperture.

10. A game call holder according to claim 1, wherein said retainer element stretch is juxtaposed said platform bottom surface, whereby said retainer element stretch may be displaced upwardly through said aperture to engage a game call disposed upon said platform top surface.

11. A game call holder comprising:

a platform having top and bottom surfaces and provided with an aperture therethrough;

a pair of legs depending from said platform, one of said pair of legs includes a pair of slots;

a retainer element including a single length resilient member having a stretch bridging said platform aperture and two ends secured adjacent one of said pair of legs and an intermediate portion releasably attachable to another one of said pair of legs, said intermediate portion being insertable within said slots; whereby said retainer element stretch may be deflected under tension to captively retain a game call having a lower sound emanating surface disposed over said platform aperture; and a body attachment assembly carried by said platform and encirclable about a limb of a user's body to secure said platform legs against the body limb; whereby the game call lower sound emanating surface is retained substantially spaced from the body limb.

* * * * *